US012664144B1

(12) United States Patent
Kwa et al.

(10) Patent No.: US 12,664,144 B1
(45) Date of Patent: Jun. 23, 2026

(54) ORDINALS FOR ENABLING LOCALIZED EDITS OF DATA

(71) Applicant: NBCUniversal Media, LLC, New York, NY (US)

(72) Inventors: Ben H. Kwa, La Crescenta, CA (US); Chi-wei Tseng, San Diego, CA (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 18/989,293

(22) Filed: Dec. 20, 2024

(51) Int. Cl.
*G06F 16/22* (2019.01)
*G06F 16/23* (2019.01)

(52) U.S. Cl.
CPC .......... *G06F 16/2246* (2019.01); *G06F 16/23* (2019.01)

(58) Field of Classification Search
CPC .. G06F 16/2228; G06F 16/2246; G06F 16/23; G06F 16/24
See application file for complete search history.

(56) References Cited

U.S. PATENT DOCUMENTS 8,805,891 B2 * 8/2014 Deschler ............. G06F 16/2246
707/802
2004/0243553 A1 * 12/2004 Bailey ................ G06F 16/9027
2010/0074141 A1 * 3/2010 Nguyen ................. H04L 41/22
370/254
2020/0134458 A1 * 4/2020 Gottschlich ............... G06F 8/30
2023/0367754 A1 * 11/2023 Beri .................. G06F 16/2246
2024/0061826 A1 * 2/2024 Beri ........................ G06F 40/14

OTHER PUBLICATIONS

Duits, et al.; Optimal Paths for Variants of the 2D and 3D Reeds-Shepp Car with Applications in Image Analysis; Jounal of Mathematical Imaging and Vision; Feb. 20, 2018; 60:816-848.
European Search Report; EP Application No. 25214229.4; dated Feb. 23, 2026.

* cited by examiner

*Primary Examiner* — James E Richardson
(74) *Attorney, Agent, or Firm* — Fletcher Yoder, P.C.

(57) ABSTRACT

An improved system and an improved method are provided for organizing and managing a dataset using an ordinal system based on an optimized indexing tree, such as a Stern-Brocot tree. The ordinal system employs unique fractional numbers in the Stern-Brocot tree as indices, which are assigned to data entries of the dataset to locate and access these data entries quickly. Thus, the present disclosure provides an improved data management strategy with improved space complexity, improved comparison operation performance, simplified implementation, and reduced storage growth size/rate, compared to its predecessors.

20 Claims, 6 Drawing Sheets

100 ⟶

200 ⟶

ORDINALS FOR ENABLING LOCALIZED EDITS OF DATA

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The origin of animation dates back to the early 20th century, where early animators used painstaking methods to create motion by drawing each frame individually or using physical models for stop-motion. These traditional methods required meticulous attention to detail, significant manual effort, extensive skill and patience to ensure consistency and realism in the movement of characters.

In recent decades, the introduction and development of animation rigging software revolutionizes animation production by streamlining the creation and manipulation of complex character animations. Typically, animation rigging software allows animators to create and manage digital skeletons, which include hierarchical structures of virtual bones or joints, of animating characters or objects in 3D environments, such that the animators may produce fluid and precise motions by simply manipulating these virtual bones or joints. Some animation rigging software may include advanced features to further enhance the efficiency of the animation process. For example, the animation rigging software may allow the use of pre-built rigging templates that can be applied to new models to reduce time animators may spend on technical setup. As another example, the software may provide functions that automatically ensure consistency in character movements across different scenes, which may significantly speed up the animation workflow and reduce manual labor.

However, it is presently recognized that advanced animation rigging software may be resource-intensive as it may require significant storage computational power to handle and manage complex animation rigs. As rigs become more sophisticated, the size of associated animation data can grow substantially. For example, sophisticated rigs may include multiple versions, backups, and assets, which may amplify storage requirements. Consequently, improved systems and methods that provide ample and fast storage solutions and employ advanced storage logistics strategies may be desirable to effectively handle and manage the animation data and support a smooth animation workflow.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment of the present disclosure, a tangible, non-transitory, computer-readable medium, comprises computer-readable instructions that, when executed by one or more processors of one or more computers, cause the one or more computers to receive an indication of an edit to at least a portion of a dataset. In response to receiving the indication of the edit, the instructions, when executed by one or more processors of one or more computers, also cause the one or more computers to calculate one or more indices associated with the edit and store the edit by modifying the dataset using the one or more indices, where the one or more indices include one or more ordinal fractions corresponding to at least the portion of the dataset.

In accordance with another embodiment of the present disclosure, a method includes receiving, via one or more processors, an indication of an edit to at least a portion of a dataset. The method also includes, in response to receiving the indication of the edit, calculating, via the one or more processors, one or more indices associated with the edit and storing, via the one or more processors, the edit by modifying the dataset using the one or more indices, where the one or more indices include one or more ordinal fractions corresponding to at least the portion of the dataset.

In accordance with a further embodiment of the present disclosure, a system includes one or more processors and memory. The memory stores instructions executable by the one or more processors to cause the one or more processors to receive an indication of an edit to at least a portion of a dataset. The memory also stores instructions executable by the one or more processors to cause the one or more processors to, in response to receiving the indication of the edit, calculate one or more indices associated with the edit and store the edit by modifying the dataset using the one or more indices, where the one or more indices include one or more ordinal fractions corresponding to at least the portion of the dataset.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a diagram of an example ordinal system utilizing an optimized indexing tree, such as the Stern-Brocot tree, to

Figure 5:
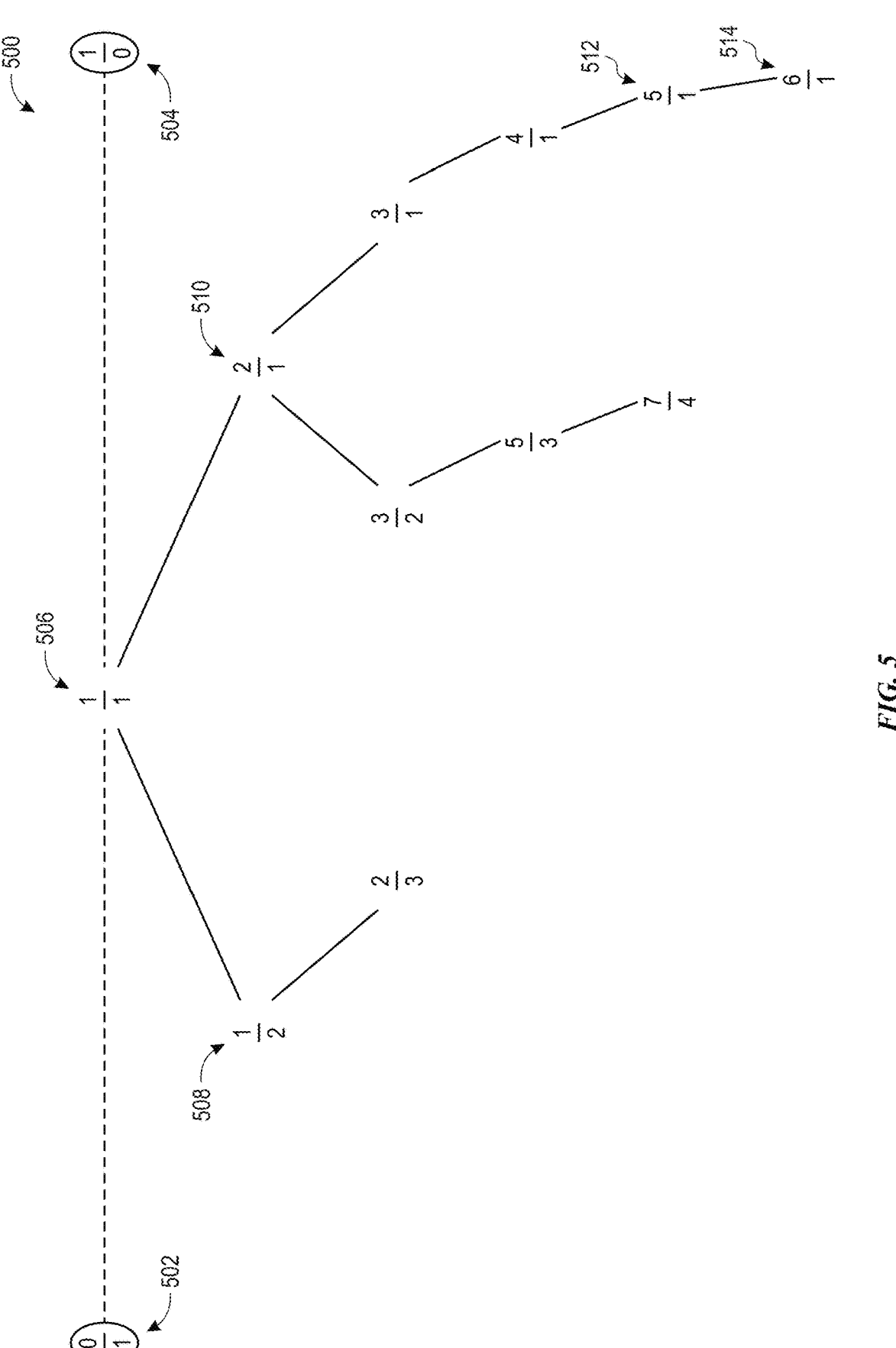
Figure 6:
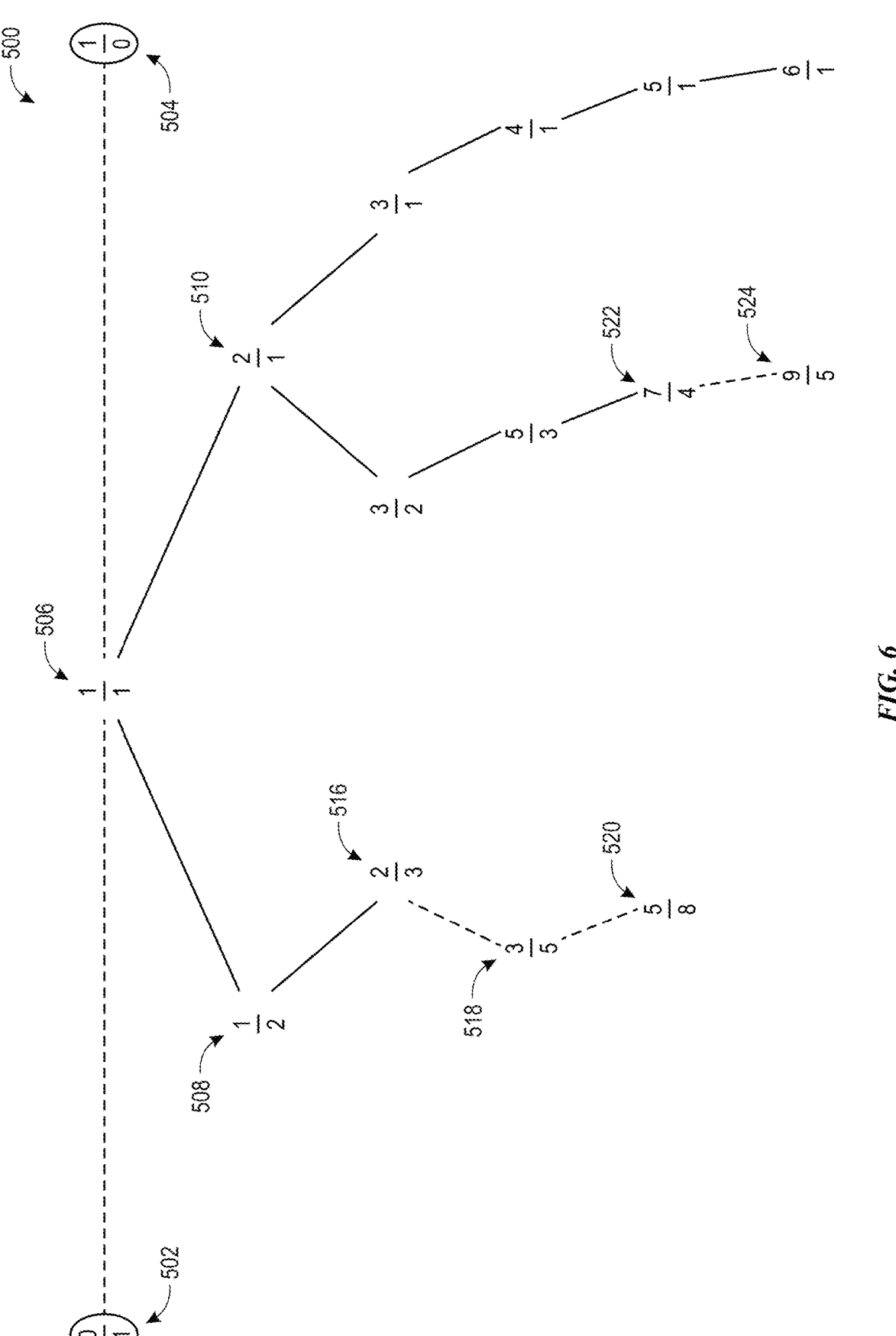
Figure 7:
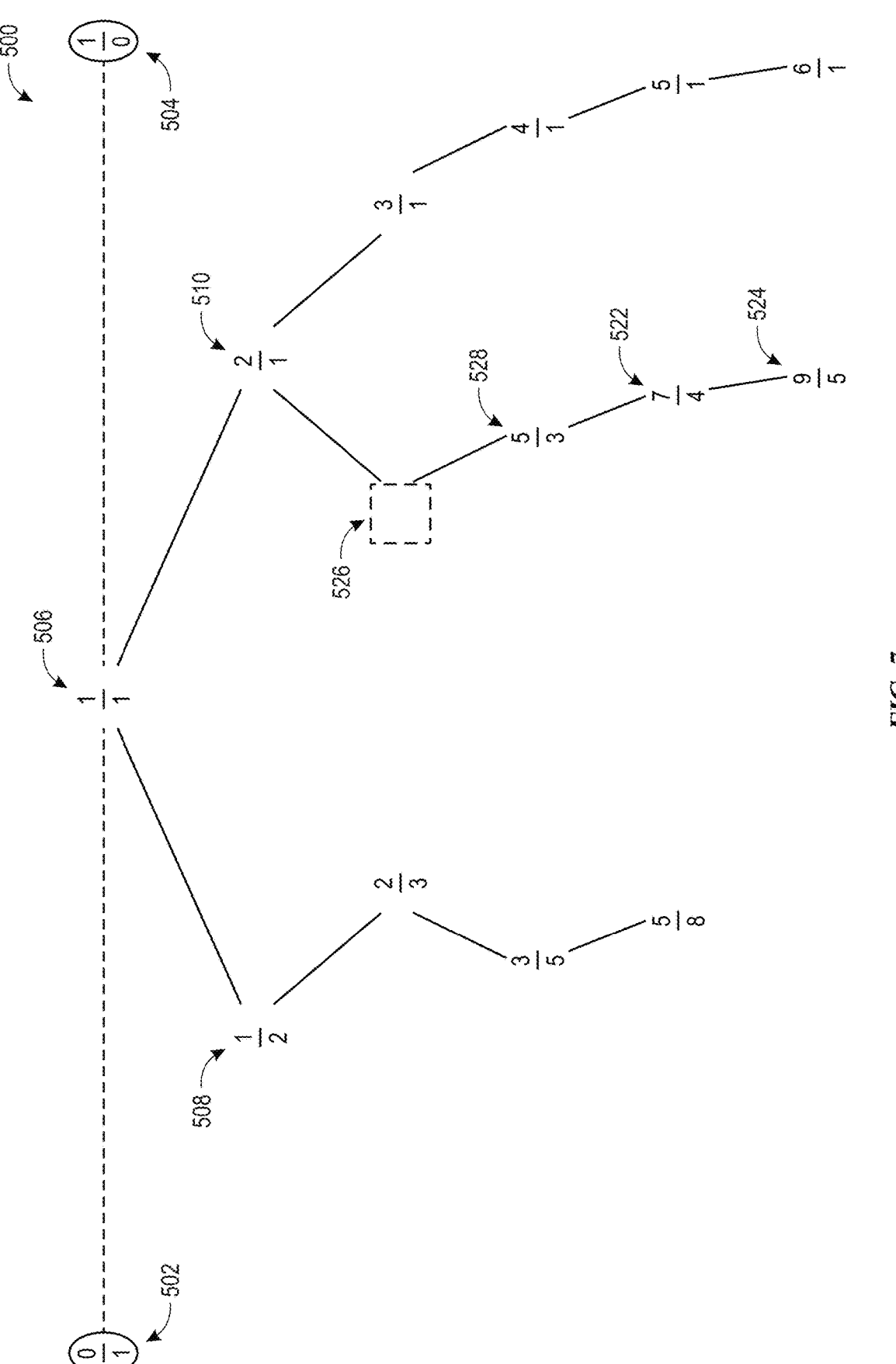

3 organize and manage datasets, in accordance with certain embodiments of the present disclosure;

FIG. 5 is a diagram of another example ordinal system, where the ordinal system receives an indication indicative of an edit corresponding to appending data to a dataset corresponding to the ordinal system, in accordance with certain embodiments of the present disclosure;

FIG. 6 is a diagram of the example ordinal system of FIG. 5, where the ordinal system receives an indication indicative of an edit corresponding to inserting data to a dataset corresponding to the ordinal system, in accordance with certain embodiments of the present disclosure; and FIG. 7 is a diagram of the example ordinal system of FIG. 5, where the ordinal system receives an indication indicative of an edit corresponding to deleting data from a dataset corresponding to the ordinal system, in accordance with certain embodiments of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As previously discussed, systems and methods to improve efficiency in handling and managing animation data may be desirable to support a smooth animation workflow. Advanced animation rigging software may utilize an ordinal system to organize and manage certain internal data structures and processes systematically and effectively. The ordinal system may assign ordinals to different data entries within a dataset to index data, where the data entries may correspond to distinct items or components that may be organized according to a specific order (e.g., of importance, time, or hierarchy). For example, animation rigging software may organize the virtual bones within a character's digital skeleton, where each bone is assigned a position in a hierarchical order to dictate how movements and transformations propagate through the skeleton. As a more specific example, in a simple humanoid character, an upper arm bone may be positioned as a parent (e.g., having a higher hierarchy) of a lower arm bone, such that any movement or rotation applied to the upper arm may influence the lower arm. Similarly, ordinal systems may be utilized to organize animation layers, control handles and manipulators, constraints and parameters, assets (e.g., textures, shaders, meshes), or any other suitable animation data to ensure the data is processed and interpolated in a logical sequence.

Additionally or alternatively, an ordinal system may be utilized to establish a sequence of animation edits. For instance, an ordinal system may manage different versions (e.g., stages of editing process) of an animation by structuring them in a sequential order (e.g., creating a chronological record of changes). As such, animators may track the editing process easily, enabling them to review the evolution of their work, rollback to previous versions if needed, and compare various iterations to analyze the impact of edits. Additionally, the ordinal system may help manage feedback and revisions systematically, ensuring that edits are applied in an organized manner. By structuring versions sequentially, an ordinal system provides a well-documented and efficient approach to managing and refining animation edits throughout the production process.

As previously described, in a dataset, each data entry may be assigned a unique index number that helps in quickly locating and accessing the data entry. Traditional ordinal systems may be configured to assign whole numbers (e.g., 1, 2, 3, 4, . . . ) as indices to different nodes in a binary tree based on their level and position. For example, nodes may be numbered level by level from left to right, starting with a root node at index 1 at the top of the binary tree, with its left child at index 2 and its right child at index 3 in the second level. Moving down one level, the node at index 2 may have its left child at index 4 and its right child at index 5, and the node at index 3 may have its left child at index 6 and its right child at index 7, with subsequent levels and positions following a similar pattern. However, such traditional configurations may suffer from poor space complexity (e.g., ordinals grow in size at a high rate), expensive comparison operations, complex implementation, and undesirably large and fast storage growth (e.g., linear growth). Accordingly, it is now recognized that improved ordinal systems are desired.

In contrast, the presently disclosed ordinal systems employ numbers (e.g., fractions) in an optimized indexing tree, such as a Stern-Brocot tree, as indices to improve space complexity, improve comparison operation performance, simplify implementation, and reduce storage growth size/rate. The Stern-Brocot tree is an infinite complete binary tree in which the nodes correspond one-for-one to the positive fractions. Notably, an in-order traversal of the Stern-Brocot tree visits the fractions in ascending order. The Stern-Brocot tree is built starting with two fractions: 0/1 (left) and 1/0 (right), which serve as the initial boundary fractions. The root of the tree is fraction 1/1. The tree is constructed by finding the mediant of two boundary fractions, which is calculated as $$\frac{a+c}{b+d},$$

where a/b and c/d are the two boundary fractions being combined, respectively. This mediant is inserted between the two boundary fractions to create a new node in the tree. For example, the left child of fraction 1/1, which is the mediant of 0/1 and 1/0, is the mediant of 0/1 and 1/1, which is $$\frac{0+1}{1+1} = 1/2,$$

whereas the right child of fraction 1/1 is the mediant of 1/1 and 1/0, which is $$\frac{1+1}{1+0} = 2/1.$$

As such, the indices in the second level of the Stern-Brocot tree, from left to right, are 1/2 and 2/1. Moving down one level, the left child of fraction 1/2, which is the mediant of 0/1 and 1/1, is the mediant of 0/1 and 1/2, which is $$\frac{0+1}{1+2} = 1/3,$$

whereas the right child of fraction 1/2 is the mediant of 1/2 and 1/1, which is $$\frac{1+1}{2+1} = 2/3;$$

similarly, the left child of fraction 2/1, which is the mediant of 1/1 and 1/0, is the mediant of 1/1 and 2/1, which is $$\frac{1+2}{1+1} = 3/2,$$

whereas the right child of fraction 2/1 is the mediant of 2/1 and 1/0, which is $$\frac{2+1}{1+0} = 3/1.$$

As such, the indices in the third level of the Stern-Brocot tree, from left to right, are 1/3, 2/3, 3/2, and 3/1. The latter levels of the Stern-Brocot tree may be populated in a similar manner.

The presently disclosed ordinal systems may organize and manage a dataset by referencing an optimized indexing tree, such as the Stern-Brocot tree. Specifically, the ordinal systems may assign the fractions in the Stern-Brocot tree as "ordinal fractions" to index the data entries within a dataset. The assignment of the ordinal fractions to the data entries may be conducted in a manner that is indicative of an order in which the dataset is organized. For example, the ordinal fractions may be assigned to reflect the sequential order in which the data entries should be visited and accessed. In this example, a first data entry that should be visited and accessed earlier than a second data entry may be assigned a first ordinal fraction that is smaller in value than a second ordinal fraction that may be assigned to the second data entry. Thus, by organizing and managing the dataset according to the Stern-Brocot tree, the presently disclosed ordinal system may yield a list of ordinal fractions that encodes a node traversal that defines the sequence in which data entries are visited and accessed. In other words, the presently disclosed ordinal systems may enable data organizations that reflect the inherent relationships as indicated by relationships among fractions, providing a more comprehensive and structured approach to organize and manage data entries of a dataset compared to traditional ordinal systems.

Figure 1:
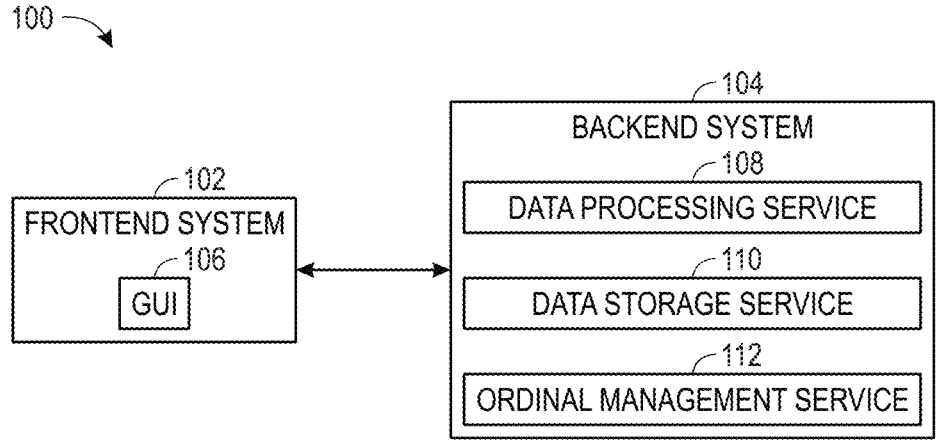
FIG. 1 is a diagram of a software environment, where the software environment may employ an ordinal system based on an optimized indexing tree (e.g., a Stern-Brocot tree) to organize and manage datasets, in accordance with certain embodiments of the present disclosure.

With the foregoing in mind, FIG. 1 is diagram of a software environment 100 of an application, where the software environment 100 may employ an ordinal system constructed based on an optimized indexing tree, such as a Stern-Brocot tree, to organize and manage datasets. The software environment 100 may include a frontend system 102 that corresponds to the client-side part of the application that interacts directly with a user and a backend system 104 that corresponds to the server-side part of the application that handles data and infrastructures to support the functionality of the frontend system 102. The frontend system 102 may include a graphical user interface (GUI) 106 to facilitate user interactions. The GUI 106 may include interactive elements such as buttons, forms, sliders, menus, and icons to create the visual and interactive components of an application. For example, the frontend system 102 may, via the GUI 106, intake user inputs indicative of an edit to a dataset (e.g., appendage, insertion, or deletion of data in a dataset) and, accordingly, update the GUI 106 to reflect the edit. The backend system 104 may include a data processing service 108 that processes user inputs, performs calculations, manages application workflows, and/or conducts any other computational tasks. For example, the backend system 104 may, via the data processing service 108, process the user inputs indicative of the aforementioned edit collected via the GUI 106 and perform calculations associated with the edit according to backend logistics. As a more specific example, via the data processing service 108 and/or an ordinal management service 112, the backend system 104 may calculate an ordinal fraction in the ordinal system corresponding to the edit to the dataset based on the optimized indexing tree (e.g., Stern-Brocot tree). Additionally, the backend system 104 may include a data storage service 110 that manages datasets associated with the application and provides data storage solutions to these application datasets. Further, the backend system 104 may include an ordinal management service 112 that maintains and/or modifies the ordinal system constructed based on the optimized indexing tree (e.g., Stern-Brocot tree). In an aspect, the ordinals in the ordinal system may be used to manage data stored in the data storage service 110, where each ordinal may reference a position of a data entry within a dataset stored in the data storage service 110. For example, the backend system 104 may update the data storage service 110 and the ordinal management service 112 corresponding to the edit, such that the edited data may become accessible in the data storage service 110 by referencing a particular index in the ordinal system of the ordinal management service 112.

In an aspect, the application may be an application for animation rigging. The GUI 106 of the frontend system 102 may include graphical components such as rigging panels to allow users to visualize and/or manipulate rigging structures such as bone hierarchies and control handles. In an aspect, the frontend system 102 may, via the GUI 106, provide tools for adjusting digital skeletons and/or previewing animations in real time. In contrast, the backend system 104 may process user inputs from the frontend system 102, manage rigging data (e.g., rigging configurations, animation edits), and/or execute rigging algorithms (e.g., calculate bone transformations, implement animation blending).

As a specific example, a user may add fingers to a hand of a character via the GUI 106 of the frontend system 102, where rigging data associated with the hand may be stored in a dataset corresponding to the digital skeleton of the character. The dataset may be organized and referenced by an ordinal tree of the ordinal management service 112, where the ordinal tree includes one or more ordinals, each corresponding to a data entry associated with an element of the digital skeleton. For example, the rigging data associated with the hand may be accessible in the data storage service 110 by referencing an index that is a corresponding ordinal fraction in the ordinal tree of the ordinal management service 112. The backend system 104 may receive, from the frontend system 102, data corresponding to the addition of the fingers. The backend system 104 may calculate the ordinal fraction in the ordinal tree that corresponds to the hand, and, subsequently, calculate a new ordinal fraction in the ordinal tree that corresponds to the added fingers. In an aspect, the new ordinal fraction corresponding to the fingers may be a child of the ordinal fraction corresponding to the hand. The backend system 104 may then update the data storage service 110 and the ordinal management service 112 such that rigging data associated with the added fingers are stored and accessible via a reference to a corresponding ordinal fraction in an ordinal tree of the ordinal management service 112.

It should be noted that while the current techniques are described with respect to animation rigging applications, the techniques described herein may be applied to applications of other fields. For example, the application may be any suitable application that may organize and manage datasets. In one aspect, the application may be a financial application, such as a stock trading platform or a portfolio management system, that relies on establishing proper order within its datasets to track market trends and manage investments. As another example, the application may be an electronic health records system that manages patient data in a structured, chronological order to document medical histories. In other words, the presently disclosed ordinal system may be implemented into any application that organizes and manages datasets in a desired order and leverages the ordered datasets to perform specific functions tailored to its domain.

It should also be noted that the illustrated software environment 100 may be supported within a computing system (not illustrated). The computing system may include a processor, a memory and/or storage component, an input and/or output device, and a communication bus. In an aspect, the memory and/or storage component may be a tangible, non-transitory, computer-readable medium, such as a physical memory storage device, for example, a chip, a chip on a package, a memory card, etc. (e.g., a computer-readable storage medium). The memory and/or storage component may include instructions that may be read by the processor of the computing system, via the communication bus, which may be wired or wireless. The processor may execute such instructions to implement (wholly or in part) one or more attributes (e.g., as part of a method). A user may provide input to, view output from, and/or otherwise interact with a process via the input and/or output device.

Figure 2:
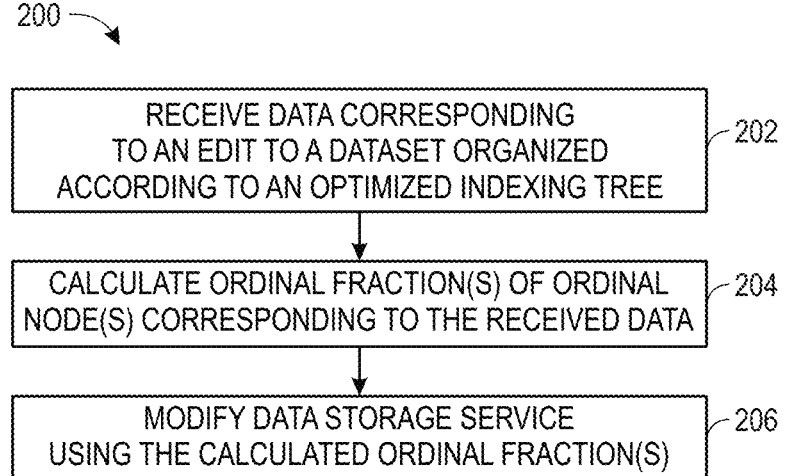
FIG. 2 is a process flow diagram illustrating a method, by which the software environment of FIG. 1 and the like may organize and manage datasets according to an ordinal system constructed based on the optimized indexing tree, in accordance with certain embodiments of the present disclosure.

FIG. 2 is a process flow diagram illustrating a method, by which the software environment of FIG. 1 and the like may organize and manage datasets according to an ordinal system constructed based on the optimized indexing tree, such as the Stern-Brocot tree. It should be noted that the steps of the method 200 illustrated in FIG. 2 and described in detail below are exemplary and should not be taken to necessarily imply a chronological order of the method 200. While the steps of the method 200 may be performed in the order illustrated in FIG. 2, presently disclosed embodiments include any suitable ordering and/or chronology of these steps. Further, certain aspects of the method 200 may include steps other than those illustrated in FIG. 2. Further still, certain steps of the method 300 illustrated in FIG. 2 may be omitted and/or altered in other aspects.

As illustrated, the method 200 may include receiving (block 202) data corresponding to an edit to a dataset. For example, the user may provide user inputs via the frontend system 102 indicative of appending data to a dataset, inserting data into the dataset, or deleting data from the dataset. As previously described, the data entries within the dataset may be organized and managed in a certain sequential order by referencing the optimized indexing tree (e.g., Stern-Brocot tree). Specifically, each data entry may be assigned a unique ordinal node of the optimized indexing tree (e.g., Stern-Brocot tree) having a unique index number (e.g., ordinal fraction) based on its position within the sequential order. As used herein, appending data to the dataset may refer to adding the data to the dataset and assigning an ordinal node corresponding to the end position of the sequential order to the added data; inserting data to the dataset may refer to adding the data to the dataset and assigning an ordinal node corresponding to an earlier position (e.g., between two certain preexisted neighboring positions) of the sequential order to the added data; and deleting data from the dataset may refer to removing certain data from the dataset and vacating an ordinal node corresponding to its current position of the sequential order.

Such user inputs may be provided by the user through interacting with the GUI 106. In an aspect, the backend system 104 may be prompted to process any edit to the dataset upon the frontend system 102 receiving user inputs corresponding to this edit via the GUI 106. In an aspect, the data processing service 108 may process the user inputs. For example, the user may provide inputs to add a pre-configured skeleton structure to an animation rig, the data processing service 108 may retrieve the rigging data associated with the pre-configured skeleton structure from the data storage service 110 before organizing (e.g., appending) data associated with the newly added skeleton structure into the dataset.

The method 200 may also include calculating (or determining) (block 204) one or more ordinal fractions of one or more ordinal nodes corresponding to the received data. In an aspect, the backend system 104 may determine which ordinal nodes of the optimized indexing tree (e.g., Stern-Brocot tree) may be associated with the received data and calculate the ordinal fractions of these associated ordinal nodes. In an aspect, such determination may be based upon a category or type of the edit the user has inputted (e.g., appending data to the dataset, inserting data into the dataset, or deleting data from the dataset). For example, the backend system 104 may determine that a first group of the ordinal nodes may be associated with a first edit of a first category and determine that a second group of the ordinal nodes may be associated with a second edit of a second category. Various aspects of the calculating are discussed in further detail below with respect to FIG. 3.

The method 200 may further include modifying (block 206) ordinal tree and data storage service (e.g., the data storage service 110 of FIG. 1) using the one or more calculated ordinal fractions. As previously described, each data entry within the dataset may be assigned a unique index number (e.g., ordinal fraction) based on the optimized indexing tree (e.g., Stern-Brocot tree) to locate and access the data entry quickly. Thus, with the one or more calculated ordinal fractions, the backend system 104 may locate the associated data entries and make modifications corresponding to the edits as indicated by the user through the frontend system 102. For example, by referencing the optimized indexing tree (e.g., Stern-Brocot tree) at the ordinal nodes corresponding to the calculated ordinal fractions, the backend system 104 may append certain data to the dataset, insert certain data into the dataset at a desired position, or delete certain data from the dataset.

Figure 3:
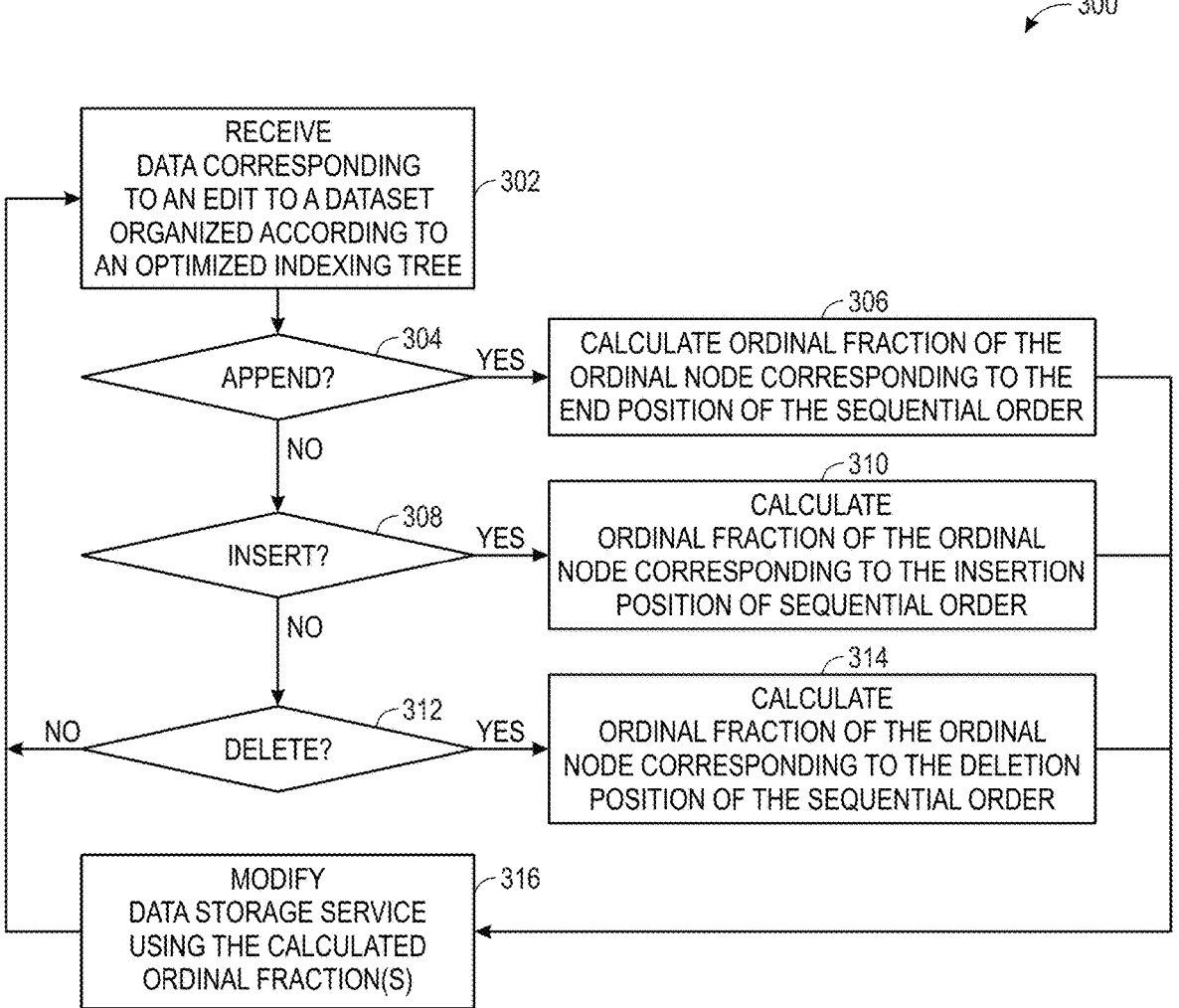
FIG. 3 is a process flow diagram illustrating a method, by which the software environment of FIG. 1 and the like may maintain and/or modify the ordinal system and its corresponding data storage service, in accordance with certain embodiments of the present disclosure.

FIG. 3 is a process flow diagram illustrating a method, by which the software environment of FIG. 1 and the like may maintain and/or modify the ordinal system and its corresponding data storage service. It should be noted that the steps of the method 300 illustrated in FIG. 3 and described in detail below are exemplary and should not be taken to necessarily imply a chronological order of the method 300. While the steps of the method 300 may be performed in the order illustrated in FIG. 3, presently disclosed embodiments include any suitable ordering and/or chronology of these steps. Further, certain aspects of the method 300 may include steps other than those illustrated in FIG. 3. Further still, certain steps of the method 300 illustrated in FIG. 3 may be omitted and/or altered in other aspects.

As illustrated, the method 300 may include receiving (block 302) data corresponding to an edit to a dataset, where the dataset may be organized and/or managed according to an optimized indexing tree, such as the Stern-Brocot tree. As previously described with respect to the block 202 of the method 200, the frontend system 102 may receive user inputs indicative of the edit to the dataset. In an aspect, such edit may correspond to appending data to the dataset, inserting data into the dataset, or deleting data from the dataset.

As described previously with respect to FIG. 2, the backend system 104 may determine which ordinal nodes of the Stern-Brocot tree may be associated with the received data and calculate the ordinal fractions of these associated ordinal nodes. In an aspect, such determination may be based upon a category of the edit the user has inputted (e.g., appending data to the dataset, inserting data into the dataset, or deleting data from the dataset).

More specifically, the method 300 may include determining (block 304) whether the edit corresponds to appendage of data to the dataset. As previously described, appendage of data to the dataset may refer to adding the data to the dataset and assigning an ordinal node corresponding to the end position of the sequential order to the added data. In response to determining that the edit corresponds to appendage of data to the dataset, the method 300 may proceed to calculate (block 306) the ordinal fraction of the ordinal node corresponding to the end position of the sequential order. The calculating may include identifying and calculating the ordinal fraction of the ordinal node corresponding to the current end position of the sequential order. As previously noted, in the Stern-Brocot tree, the ordinal nodes may be sorted in ascending order using an in-order traversal of the tree. Thus, the end position of the sequential order may correspond to the furthest right node at the bottom level. Various aspects of the calculation of the ordinal fraction of the ordinal node corresponding to the end position of the sequential order are described in further detail with respect to FIG. 5.

The method 300 may include determining (block 308) whether the edit corresponds to insertion of data to the dataset. As previously described, insertion of data to the dataset may refer to adding the data to the dataset and assigning an ordinal node corresponding to an earlier position (e.g., between two certain preexisted neighboring positions) of the sequential order to the added data. In response to determining that the edit corresponds to insertion of data to the dataset, the method 300 may proceed to calculate (block 310) the ordinal fraction of the ordinal node corresponding to the insertion position of the sequential order. Such calculation of the ordinal fraction may include identifying and calculating the ordinal fractions of the ordinal nodes that are corresponding to the two preexisted neighboring positions of the sequential order. For example, the method 300 may include calculating the ordinal fraction of the ordinal node that is immediately before the insertion position of the sequential order and the ordinal fraction of the ordinal node that is immediately after the insertion position of the sequential order. Subsequently, based on these ordinal fractions, the ordinal fraction of the ordinal node corresponding to the insertion position may be calculated. Various aspects of the calculation of the ordinal fraction of the ordinal node corresponding to the insertion position of the sequential order are described in further detail with respect to FIG. 6.

The method 300 may include determining (block 312) whether the edit corresponds to deletion of data from the dataset. As previously described, deletion of data from the dataset may refer to removing certain data from the dataset and vacating an ordinal node corresponding to its current position of the sequential order. In response to determining that the edit corresponds to deletion of data to the dataset, the method 300 may proceed to calculate (block 314) ordinal fraction of the ordinal node corresponding to the deletion position of within the sequential order. Various aspects of the calculation of the ordinal fraction of the ordinal node corresponding to the deletion position of the sequential order are described in further detail with respect to FIG. 7.

It should be noted that the method 300 merely provides an exemplary method of how the ordinal system may be implemented to edit the dataset based on the Stern-Brocot tree. The calculations following different types of edits may be modified to organize and manage the dataset in any suitable manner depending on the application. For example, in an aspect, the ordinal nodes may be sorted in descending order using an in-order traversal of the tree; thus, in response to an edit corresponding to appending of data to the dataset, the method 300 may proceed to calculate the ordinal fraction of the ordinal node corresponding to the first position of the sequential order, as opposed to the end position of the sequential order. Indeed, the ordinal system may be implemented in any suitable manner to organize and/or manage the dataset based on the Stern-Brocot tree.

With the calculated ordinal fraction(s) and the data, the method 300 may proceed to modify (block 316) data storage service, such as the data storage service 110 of FIG. 1. In an aspect, the dataset is stored in the data storage service 110 and the calculated ordinal fraction(s) may enable the backend system 104 to locate and access the associated data entries in the dataset. As such, the backend system 104 may, at the data storage service 110, modify the dataset to reflect the edit inputted by the user. Additionally, the frontend system 102 may update the GUI corresponding to the modified dataset. Subsequently, the method 300 may return to the block 302 to continue monitoring if any additional edit is performed to the dataset.

In an aspect, if the method 300 determines that the edit does not correspond to appending data to the dataset, inserting data into the dataset, or deleting data from the dataset, the backend system 104 may determine that the edit to the dataset does not have an effect or has limited effect on the dataset and, thus, the data storage service 110 does not need to be modified. Subsequently, the method 300 may return to the block 302 to continue monitoring if any additional edit is performed to the dataset.

Figure 4:
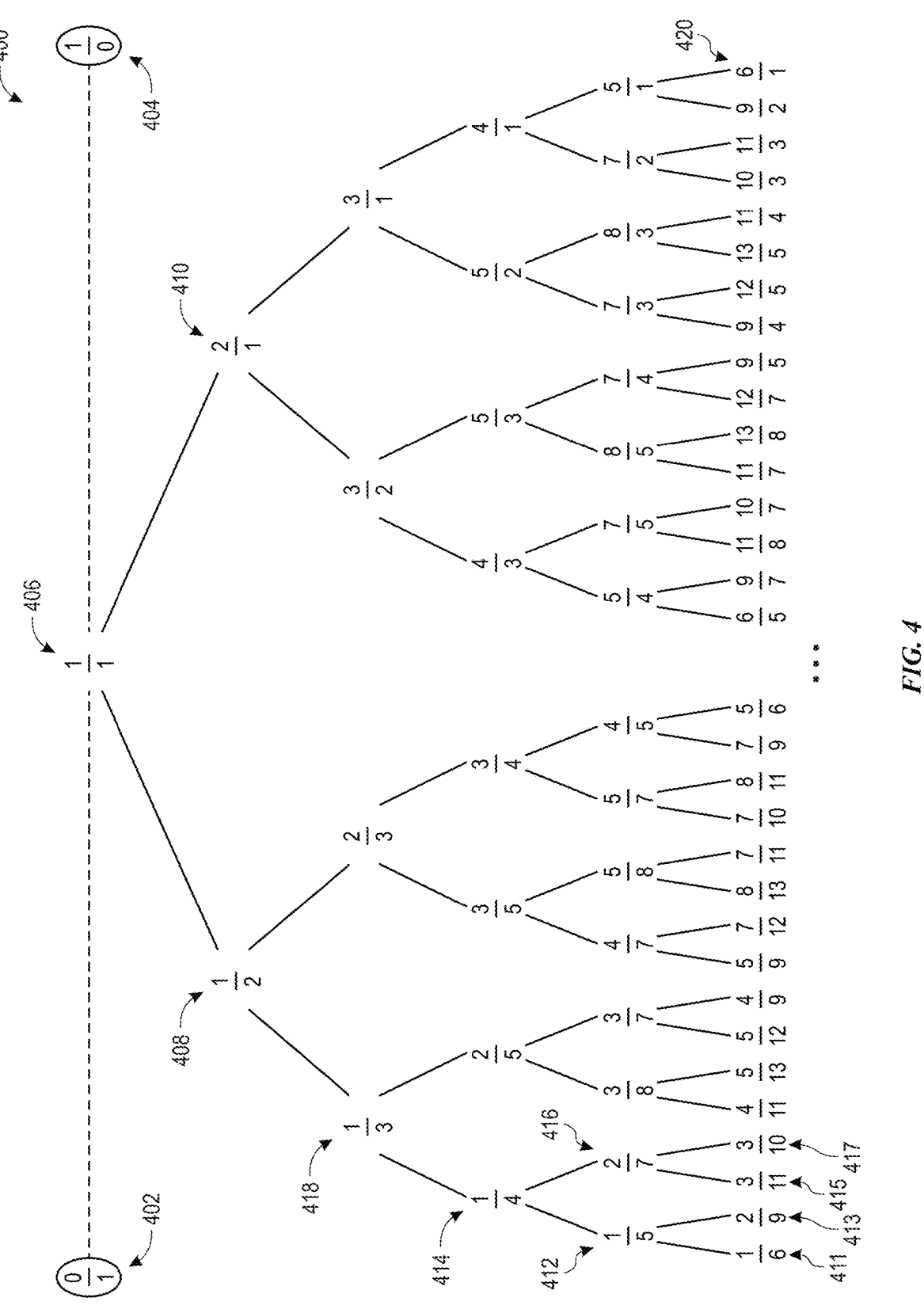

With the foregoing in mind, FIG. 4 is a diagram of an example ordinal system 400 utilizing an optimized indexing tree, such as the Stern-Brocot tree, to organize and manage a dataset. The data entries within the dataset may be arranged in reference to an ordinal system, such as an ordinal system constructed based on the Stern-Brocot tree. As previously described, the Stern-Brocot tree uses fractional numbers as indices.

In the illustrated embodiment, the Stern-Brocot tree is fully populated to its sixth level. The Stern-Brocot tree is built starting with two initial boundary fractions: a left boundary fraction 402 corresponding to 0/1, and a right boundary fraction 404 corresponding to 1/0. Given two boundary fractions, the a/b and c/d, the mediant of the boundary fractions is $$\frac{a+c}{b+d}.$$

Tne root node 406 (or parent node) of the Stern-Brocot tree is 1/1, which is also the mediant of the initial boundary fractions. The left child of a parent node is the mediant of the parent node and the left boundary fraction, and the right child is the mediant of the parent node with the right boundary fraction. For example, the left child 408 of the root node 406 is 1/2, whereas the right child 410 of the root node 406 is 2/1. The indices of the nodes in the succeeding levels may be calculated in a similar manner. It may be observed that within each level of the Stern-Brocot tree, the fractions are arranged in an increasing order. It may also be observed that given any index (i.e., ordinal fraction), one may trace the path from the root node 406 to the position of the given index in the tree.

As such, if a dataset is organized and managed in reference to an ordinal system, where each data entry of the dataset is assigned with a fractional number as its index according to the ordinal system based on the Stern-Brocot tree, the backend system 104 may establish a sequential order for any given data entry of the dataset. Furthermore, each node within the Stern-Brocot tree may be traced back to the root node. Specifically, in the Stern-Brocot tree, the relationship between parent nodes and child nodes may also be understood in terms of continued fractions. Every ordinal fraction q may be expressed as a continued fraction of the form $$q = a_0 + \cfrac{1}{a_1 + \cfrac{1}{a_2 + \cfrac{1}{a_3 + \cfrac{1}{\cdots + \cfrac{1}{a_k}}}}} = [a_0; a_1, a_2, a_3, \cdots, a_k],$$

where k and $a_0$ are non-negative integers, and each subsequent coefficient $a_i$ is a positive integer. Unless q=1 (i.e., q is the root node), the parent of the ordinal fraction q may be expressed as a continued fraction of the form $[a_0; a_1, a_2, \ldots, a_k-1]$. With this in mind, by referencing the Stern-Brocot tree, any data entry of the dataset may have a clear lineage encoded within its associated ordinal fraction.

Further, for any two distinct data entries of the dataset, the backend system 104 may calculate relative position information based on the indices of the nodes these data entries are associated with by referencing to the ordinal system 400. Thus, the ordinal system 400 enables the backend system 104 to encode a node traversal that defines the sequence in which the data entries of the dataset may be accessed.

For example, in the illustrated embodiment, the Stern-Brocot tree is fully populated to its sixth level, where the first level includes a single node, the root node 406, the second level includes two nodes, node 408 and node 410, the third level includes four nodes, the fourth level includes eight nodes, the fifth level includes 16 nodes, and the sixth level includes 32 nodes. Each node in the Stern-Brocot tree may correspond to a specific data entry within a dataset, where each node may be assigned the ordinal fraction of the corresponding node as its index, such that the data entries within the dataset may be organized and managed.

Notably, the ordinal fractions within the Stern-Brocot tree are in ascending order using an in-order traversal of the tree. For example, the ordinal node at the right end of the sixth level of the tree, node 411, corresponds to the smallest ordinal fraction (1/6). The ordinal node at the right end of the fifth level, node 412, corresponds to the second smallest ordinal fraction (1/5). The ordinal node at the second right position of the sixth level, node 413, corresponds to the third smallest ordinal fraction (2/9). The ordinal node at the right end of the fourth level, node 414, corresponds to the fourth smallest ordinal fraction (1/4). The ordinal node at the third right position of the sixth level, node 415, corresponds to the fifth smallest ordinal fraction (3/11). The ordinal node at the second right position of the fifth level, node 416, corresponds to the sixth smallest ordinal fraction (2/7). The ordinal node at the fourth right position of the sixth level, node 417, corresponds to the seventh smallest ordinal fraction (3/10). The ordinal node at the right end of the third level, node 418, corresponds to the eighth smallest ordinal fraction (1/3). The values of the other ordinal nodes in the Stern-Brocot tree are sorted in such manner; as such, the ordinal node at the left end of the sixth level of the tree, node 420, corresponds to the largest ordinal fraction (6/1).

In an aspect, the data entries within the dataset to be accessed earlier may be assigned an ordinal node with a smaller value, whereas the data entries to be accessed later may be assigned an ordinal node with a larger value. In this manner, for the dataset organized and managed according to the Stern-Brocot tree of the ordinal system 400, the data entry assigned with node 411 may be accessed first, followed by the data entry assigned with node 412, the data entry assigned with node 413, and so forth. As such, an order in which the data entries within the dataset may be accessed may be established by referencing to the Stern-Brocot tree of the ordinal system 400. It should be noted that such order may not be limited to the order in which the data entries may be accessed; the ordinal fractions may be assigned to the data entries to establish any suitable sequential order to organize and manage the dataset.

Edits to the dataset may be reflected in an ordinal system in the manner described in respect to FIGS. 5-7. However, the following description merely sets an exemplary method for the backend system 104 to process the edits, which may be received as various user inputs to the frontend system 102. In the illustrated embodiment corresponds to FIGS. 5-7, an ordinal system 500 that uses an optimized indexing tree, such as the Stern-Brocot tree, to organize and manage a certain dataset is shown to demonstrate the calculations of relevant ordinal fractions of the Stern-Brocot tree upon the ordinal system 500 receiving various types of edits that may be imposed on the dataset. Similar to the ordinal system 400 of FIG. 4, the Stern-Brocot tree of the ordinal system 500 is built starting with two initial boundary fractions: a left boundary fraction 502 corresponding to 0/1, and a right boundary fraction 504 corresponding to 1/0. In contrast to the ordinal system 400, the ordinal system 500 is not fully populated and includes various nodes, such as nodes 506, 508, and 510, for indexing the data entries within the certain dataset. Specifically, the nodes, when accessed using an in-order node traversal, have individual ordinal fractions of 1/2, 2/3, 1/1, 3/2, 5/3, 7/4, 2/1, 3/1, 4/1, and 5/1, respectively.

FIG. 5 is a diagram of the ordinal system 500, where the ordinal system 500 receives an indication indicative of an edit corresponding to appending data to a dataset corresponding to the ordinal system 500. As previously described, in response to receiving such indication, the edit may be assigned an ordinal node that corresponds to an end position of the sequential order established by the Stern-Brocot tree. Thus, the ordinal fraction of the ordinal node corresponding to the current end position of the sequential order may be identified. In the illustrated embodiment, the current end position is the ordinal node is node 512, which has a corresponding ordinal fraction of 5/1. Subsequently, the left child of node 512, node 514, may be calculated to propagate the Stern-Brocot tree such that a new end position may be added after the previous end position. Node 514 of the ordinal system 500 may, accordingly, be assigned to the edit corresponding to appending the data entry to the dataset such that this data entry may be accessed last.

FIG. 6 is a diagram of the ordinal system 500, where the ordinal system 500 receives an indication indicative of an edit corresponding to inserting data into a dataset corresponding to the ordinal system 500. As previously described, in response to receiving such indication, the edit may be assigned an ordinal node that corresponds to an insertion position of the sequential order established by the Stern-Brocot tree. Thus, the ordinal fractions corresponding to the immediate neighboring positions of the insertion position may be identified.

For example, in the illustrated embodiment, the ordinal system 500 may receive an indication corresponding to inserting a data entry after the data entry associated with ordinal node 508, which has a corresponding ordinal fraction of 1/2. The ordinal system 500 may survey the present ordinal nodes within the ordinal system 500 and identify that ordinal node 516, which has a corresponding ordinal fraction of 2/3, is currently immediately after node 508 in the established sequential order. To insert a new ordinal node between ordinal node 508 and ordinal node 516, a right child of node 516, node 518, may be calculated to propagate the Stern-Brocot tree. Node 518 of the ordinal system 500 may, accordingly, be assigned to the edit corresponding to inserting a data entry after the data entry associated with ordinal node 508.

Note that the calculation of the ordinal fraction associated with the inserted data entry depends on the relationship between the two ordinal nodes corresponding to the two immediate neighboring positions. Indeed, an ordinal node may be inserted as either a left child of the former node (e.g., node with a smaller ordinal fraction value) or a right child of the latter node (e.g., node with a larger ordinal fraction value). However, a determination as to whether the ordinal node may be inserted as the left child of the former node or the right child of the latter node should be made depending on the current propagation of the Stern-Brocot tree.

For example, to insert a second data entry between the previously inserted data entry to which ordinal node 518 is assigned and the data entry to which ordinal node 516 is assigned, a determination as to whether a new ordinal node should be inserted as the left child of ordinal node 518 or the right child of ordinal node 516 may be made. In this example, the right child of ordinal node 516 has been occupied by ordinal node 518, while the left child of ordinal node 518 is currently not assigned. Thus, the inserted data entry may be assigned an ordinal fraction of 5/8, which corresponds to ordinal node 520, the left child of ordinal node 518.

As yet another example, to insert a third data entry before data entry associated with node 510, which has a corresponding ordinal fraction of 2/1, the ordinal system 500 may survey the present ordinal nodes within the ordinal system 500 and determine that ordinal node 522, which has a corresponding ordinal fraction of 7/4, is currently immediately before node 510 in the established sequential order. A determination as to whether a new ordinal node should be inserted as the left child of ordinal node 522 or the right child of ordinal node 510 may be made. In this example, the right child of ordinal node 510 has been occupied by an assigned ordinal node, while the left child of ordinal node 518 is currently not assigned. Thus, the inserted data entry may be assigned an ordinal fraction of 9/5, which corresponds to ordinal node 524, the left child of ordinal node 522. Thus, upon the aforementioned one exemplary appendage and three exemplary insertions, the nodes of the ordinal system 500, when accessed using an in-order node traversal, have individual ordinal fractions of 1/2, 3/5, 5/8, 2/3, 1/1, 3/2, 5/3, 7/4, 9/5, 2/1, 3/1, 4/1, 5/1, 6/1, respectively; a sequential order is established for the data entries within the dataset.

FIG. 7 is a diagram of the ordinal system 500, where the ordinal system 500 receives an indication indicative of an edit corresponding to deleting data from a dataset corresponding to the ordinal system 500. As previously described, in response to receiving such indication, the system 500 may identify the ordinal node that corresponds to the data entry to be deleted and, subsequently, vacate the ordinal node. For example, in the illustrated embodiment, the ordinal system 500 may receive an indication corresponding to deleting the data entry associated with ordinal node 526 from the dataset. The ordinal system 500 may determine that ordinal node 526 has a corresponding ordinal fraction of 3/2, and, thus, delete the data entry assigned ordinal fraction of 3/2. In an aspect, while the data entry associated with ordinal node 526 is removed from the dataset, the sequential order established elsewhere within the ordinal system 500 may remain unchanged. While the data entries associated with ordinal nodes 528, 522, and 524, which were previously sorted after the deleted data entry, are now sorted after ordinal node 506, the sequential order in which the data entries are sorted is otherwise unaffected. Thus, upon the aforementioned exemplary deletion, the nodes of the ordinal system 500, when accessed using an in-order node traversal, have individual ordinal fractions of 1/2, 3/5, 5/8, 2/3, 1/1, 5/3, 7/4, 9/5, 2/1, 3/1, 4/1, 5/1, 6/1, respectively.

By implementing an ordinal system based on the Stern-Brocot tree such as the ordinal system 500 and the like to organize and manage a dataset, storage growth is significantly reduced over traditional configurations. Internal findings indicate that, in an append workload test, implementing the ordinal system as disclosed decreases the number of bytes per ordinal required to make 100,000 inserts to merely 0.05% of the number of bytes per ordinal required for a certain traditional configuration. Thus, in applications where append workload is heavily involved, the present disclosure provides a data management strategy with significantly improved efficiency and enhanced scalability.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any features shown and described with reference to FIGS. 1-5 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A tangible, non-transitory, computer-readable medium, comprising computer-readable instructions that, when executed by one or more processors of one or more computers, cause the one or more computers to:

receive an indication of an edit to be applied to modify a dataset, wherein:

the dataset comprises hierarchical control data of a rig of a character; and the dataset is organized as a hierarchy in reference to an ordinal system that uses one or more ordinal fractions of an indexing tree as indices, and each ordinal fraction corresponds to a respective portion of the hierarchy and is indicative of a respective dependency associated with the respective portion;

in response to receiving the indication of the edit, modify the dataset by:

calculating an ordinal fraction associated with the edit; and using the calculated ordinal fraction as an index, modifying a corresponding portion of the dataset; and propagate control through the rig of the character based on the modified dataset.

2. The tangible, non-transitory, computer-readable medium of claim 1, wherein the indexing tree is a Stern-Brocot tree.

3. The tangible, non-transitory, computer-readable medium of claim 1, wherein the edit corresponds to an operation associated with a first data entry of the dataset, and wherein the tangible, non-transitory, computer-readable medium comprises instructions that, when executed by one or more processors of one or more computers, cause the one or more computers to determine the ordinal fraction to calculate based on a determination of an operation type of the edit.

4. The tangible, non-transitory, computer-readable medium of claim 3, wherein the operation type of the edit comprises appending the first data entry to the dataset, inserting the first data entry into the dataset, or deleting the first data entry from the dataset.

5. The tangible, non-transitory, computer-readable medium of claim 4, comprising instructions that, when executed by one or more processors of one or more computers, cause the one or more computers to do one or more of the following:

in response to determining that the edit corresponds to appending the first data entry to the dataset, calculate a first ordinal fraction corresponding to an end position in reference to the indexing tree;

in response to determining that the edit corresponds to inserting the first data entry to the dataset, calculate a second ordinal fraction corresponding to an insertion position in reference to the indexing tree; or in response to determining that the edit corresponds to deleting the first data entry from the dataset, calculate a third ordinal fraction corresponding to a position of the first data entry in reference to the indexing tree.

6. The tangible, non-transitory, computer-readable medium of claim 5, comprising instructions that, when executed by one or more processors of one or more computers, cause the one or more computers to calculate the second ordinal fraction by:

identify a former ordinal fraction and a latter ordinal fraction associated with immediate neighboring positions of the insertion position, wherein the former ordinal fraction corresponds to the position immediately before the insertion position, and wherein the latter ordinal fraction corresponds to the position immediately after the insertion position;

determine whether the second ordinal fraction is to be inserted as a first child of the former ordinal fraction or a second child of the latter ordinal fraction; and calculate the second ordinal fraction, wherein the second ordinal fraction is calculated as the first child of the former ordinal fraction or the second child of the latter ordinal fraction based on the determination.

7. The tangible, non-transitory, computer-readable medium of claim 1, wherein the indication of the edit comprises a user input provided via a GUI, and the tangible, non-transitory, computer-readable medium comprises instructions that, when executed by one or more processors of one or more computers, cause the one or more computers to update the GUI corresponding to the modified dataset.

8. The tangible, non-transitory, computer-readable medium of claim 1, comprising instructions that, when executed by one or more processors of one or more computers, cause the one or more computers to:

propagate the control through the rig of the character based on the modified dataset by referencing the ordinal system, wherein first hierarchical control data corresponding to a smaller ordinal fraction is accessed and implemented before second hierarchical control data corresponding to a larger ordinal fraction.

9. The tangible, non-transitory, computer-readable medium of claim 1, wherein the hierarchical control data comprises data associated with control handles of the rig of the character.

10. The tangible, non-transitory, computer-readable medium of claim 1, wherein the control handles are associated with a digital skeleton of the character.

11. A method, comprising:

receiving, via one or more processors, an indication of an edit to be applied to modify a dataset, wherein:

the dataset comprises hierarchical control data of a rig of a character; and the dataset is organized as a hierarchy in reference to an ordinal system that uses one or more ordinal fractions of an indexing tree as indices, and each ordinal fraction corresponds to a respective portion of the hierarchy and is indicative of a respective dependency associated with the respective portion;

in response to receiving the indication of the edit, modifying, via the one or more processors, the dataset by:

calculating, via the one or more processors, an ordinal fraction associated with the edit; and using the calculated ordinal fraction as an index, modifying, via the one or more processors, a corresponding portion of the dataset; and propagating control through the rig of the character based on the modified dataset.

12. The method of claim 11, wherein the dataset comprises one or more data entries, wherein the indexing tree is a Stern-Brocot tree.

13. The method of claim 11, wherein the edit corresponds to an operation associated with a first data entry of the dataset, and wherein the method comprises determining, via the one or more processors, the ordinal fraction to calculate based on a determination of an operation type of the edit, wherein the operation type of the edit comprises appending the first data entry to the dataset, inserting the first data entry into the dataset, or deleting the first data entry from the dataset.

14. The method of claim 13, comprising, in response to determining that the edit corresponds to appending the first data entry to the dataset, calculating, via the one or more processors, a first ordinal fraction corresponding to an end position in reference to an indexing tree.

15. The method of claim 13, comprising, in response to determining that the edit corresponds to inserting the first data entry to the dataset, calculating, via the one or more processors, a second ordinal fraction corresponding to an insertion position in reference to an indexing tree.

16. The method of claim 13, comprising, in response to determining that the edit corresponds to deleting the first data entry from the dataset, calculating, via the one or more processors, a third ordinal fraction corresponding to a position of the first data entry in reference to an indexing tree.

17. The method of claim 11, comprising:

propagate the control through the rig of the character based on the modified dataset by referencing the ordinal system, wherein first hierarchical control data corresponding to a smaller ordinal fraction is accessed and implemented before second hierarchical control data corresponding to a larger ordinal fraction.

18. A system, comprising:

one or more processors; and memory storing instructions executable by the one or more processors to cause the one or more processors to:

receive an indication of an edit to be applied to modify a dataset, wherein:

the dataset comprises hierarchical control data of a rig of a character; and the dataset is organized as a hierarchy in reference to an ordinal system that uses one or more ordinal fractions of an indexing tree as indices, and each ordinal fraction corresponds to a respective portion of the hierarchy and is indicative of a respective dependency associated with the respective portion;

in response to receiving the indication of the edit, modify the dataset by:

calculating an ordinal fraction associated with the edit; and using the calculated ordinal fraction as an index, modifying a corresponding portion of the dataset; and propagate control through the rig of the character based on the modified dataset.

19. The system of claim 18, wherein the dataset comprises one or more data entries, wherein the indexing tree is a Stern-Brocot tree.

20. The system of claim 18, wherein the memory storing the instructions executable by the one or more processors to cause the one or more processors to:

propagate the control through the rig of the character based on the modified dataset by referencing the ordinal system, wherein first hierarchical control data corresponding to a smaller ordinal fraction is accessed and implemented before second hierarchical control data corresponding to a larger ordinal fraction.

* * * * *